(12) United States Patent
Weinberg et al.

(10) Patent No.: US 8,402,078 B2
(45) Date of Patent: Mar. 19, 2013

(54) METHOD, SYSTEM AND COMPUTER PROGRAM PRODUCT FOR DETERMINING REQUIRED PRECISION IN FIXED-POINT DIVIDE OPERATIONS

(75) Inventors: Joshua M. Weinberg, Bronx, NY (US); Martin S. Schmookler, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 12/037,207

(22) Filed: Feb. 26, 2008

(65) Prior Publication Data

US 2009/0216824 A1    Aug. 27, 2009

(51) Int. Cl.
*G06F 7/52* (2006.01)
(52) U.S. Cl. ......... 708/650; 708/490; 708/504; 708/671
(58) Field of Classification Search ........................ None
See application file for complete search history.

(56) References Cited

U.S. PATENT DOCUMENTS

| | | | | |
|---|---|---|---|---|
| 4,084,254 | A | * | 4/1978 | Birney et al. ................ 708/655 |
| 4,488,247 | A | | 12/1984 | Inagami et al. |
| 4,817,048 | A | | 3/1989 | Rawlinson |
| 4,878,190 | A | | 10/1989 | Darley et al. |
| 5,046,038 | A | * | 9/1991 | Briggs et al. ................ 708/654 |
| 5,386,376 | A | | 1/1995 | Girard et al. |
| 5,644,524 | A | | 7/1997 | Van Aken et al. |
| 5,903,486 | A | | 5/1999 | Curtet |
| 5,937,202 | A | | 8/1999 | Crosetto |
| 6,185,596 | B1 | | 2/2001 | Hadad et al. |
| 6,487,575 | B1 | | 11/2002 | Ghosal |
| 6,560,624 | B1 | | 5/2003 | Otani et al. |
| 6,625,633 | B1 | | 9/2003 | Hirairi |
| 7,185,041 | B1 | | 2/2007 | End, III |
| 2003/0050948 | A1 | * | 3/2003 | Okawa .......................... 708/504 |
| 2004/0128337 | A1 | | 7/2004 | Roussel et al. |
| 2006/0179092 | A1 | | 8/2006 | Schmookler et al. |

OTHER PUBLICATIONS

"IBM® z/Architecture Principles of Operation", Publication No. SA22-7832-05, 6th Edition, Apr. 2007. 1,215 pages separated into 4 electronic attachments.
U.S. Appl. No. 12/036,397 Non-Final Office Action dated Mar. 3, 2011.
U.S. Appl. No. 12/036,387 Non-Final Office Action dated Mar. 30, 2011.
U.S. Appl. No. 12/037,408 Non-Final Office Action dated Mar. 7, 2011.
U.S. Appl. No. 12/037,408, Non Final Office Action Mailed Mar. 5, 2012.

* cited by examiner

*Primary Examiner* — Michael D Yaary
(74) *Attorney, Agent, or Firm* — Cantor Colburn LLP; John Campbell

(57) ABSTRACT

A method, computer program product and a system for controlling a fixed point division operation are provided. The method includes: receiving an instruction to perform a division operation for a dividend and a divisor, the operation comprising a maximum number of iterations to produce a quotient having a maximum precision; calculating a magnitude of at least one of the dividend and the divisor; determining a quotient precision based on the magnitude; and computing a required number of iterations needed to produce the quotient precision and performing the number of iterations.

18 Claims, 2 Drawing Sheets

METHOD, SYSTEM AND COMPUTER PROGRAM PRODUCT FOR DETERMINING REQUIRED PRECISION IN FIXED-POINT DIVIDE OPERATIONS

BACKGROUND OF THE INVENTION

This invention relates generally to microprocessing, and more particularly to providing methods to improve fixed point arithmetic operations. Fixed point arithmetic may also be referred to as integer arithmetic, in that all operands and results are integers.

Divide instructions in general require many cycles to achieve the desired output precision specified by a computing architecture. As such, many different algorithms have emerged to take advantage of different dataflow architectures in order to increase performance and throughput of these "slow" instructions.

Most implementations of fixed point, i.e., integer, divide are based on the SRT (Sweeney Robertson Tocher) divide algorithm, which is similar to the repeated subtraction method often done by hand called "long division". This method produces a fixed number of quotient bits each cycle, usually 1 or 2.

Some other implementations of integer divide are referred to as "iterative" algorithms. These may develop an early low precision estimate of the quotient and then iterate on that estimate until the required precision is achieved. In these schemes, each successive iteration results in a new value of the quotient with about double the precision of the previous iteration. Well-known iterative algorithms are the Newton-Raphson and Goldschmidt algorithms. Since intermediate results are inexact and require fractional values, iterative divide algorithms require that the data be represented as floating point numbers. Consequently, use of iterative algorithms for integer divide requires that the operands be converted to floating point values. When sufficient precision of the quotient is achieved, it is converted to the largest integer whose magnitude is less than or equal to the exact ratio of the dividend and divisor. This exact ratio may be referred to as the infinitely precise quotient. Because the intermediate quotient is inexact, it requires greater precision than that of the final result. For example, using decimal arithmetic, suppose that 600 is divided by 300, resulting in the value 2. Suppose also that after one iteration, the intermediate value may lie between 1.95 and 2.05. It might be tempting to just round this to 2. But suppose instead that 599 is divided by 300, or that 601 is divided by 301. For either case, the ratio is approximately 1.9967. Since the result must not be greater than this ratio, it must be rounded down to 1. Although the final quotient requires only one digit, in order to distinguish between the correct results for each case, the intermediate quotient needs at least four accurate digits, which is even greater than the number of digits in the dividend.

Variations of the SRT algorithms, on the other hand, may finish after obtaining just the required number of bits or digits of the quotient result. That is because the quotient digits that are developed at each step are exact, with a corresponding exact remainder.

Integer divide instructions must be capable of handling high precision operands and results, but "normal" workloads often work with operands of much less precision, thus requiring less precision in the result. For iterative algorithms, as seen in the example above, the intermediate result needs greater precision than that of the dividend. It is not dependent on the precision of the divisor.

In such instances, it would be advantageous to end the divide operation early when the required precision of the intermediate result is achieved. Early completion requires fewer iterations and would thus improve performance.

BRIEF SUMMARY OF THE INVENTION

An exemplary embodiment includes a method of controlling a fixed point division operation. The method includes: receiving an instruction to perform a division operation for a dividend and a divisor, the operation comprising a maximum number of iterations to produce a quotient having a maximum precision; calculating a magnitude of at least one of the dividend and the divisor; determining a quotient precision based on the magnitude; and computing a required number of iterations needed to produce the quotient precision and performing the number of iterations.

Another exemplary embodiment includes a computer program product for controlling a fixed point division operation. The computer program product includes a computer-readable storage medium for storing instructions for executing a method of: receiving an instruction to perform a division operation for a dividend and a divisor, the operation comprising a maximum number of iterations to produce a quotient having a maximum precision; calculating a magnitude of at least one of the dividend and the divisor; determining a quotient precision based on the magnitude; and computing a required number of iterations needed to produce the quotient precision and performing the number of iterations.

A further exemplary embodiment includes a system for controlling a fixed point division operation. The system includes an instruction dispatching unit (IDU) for sending an instruction to perform a division operation for a dividend and a divisor, the operation comprising a maximum number of iterations to produce a quotient having a maximum precision, and a processor in operable communication with the IDU. The processor performs: receiving the instruction from the IDU; calculating a magnitude of at least one of the dividend and the divisor; determining a quotient precision based on the magnitude; and computing a required number of iterations needed to produce the quotient precision and performing the number of iterations.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
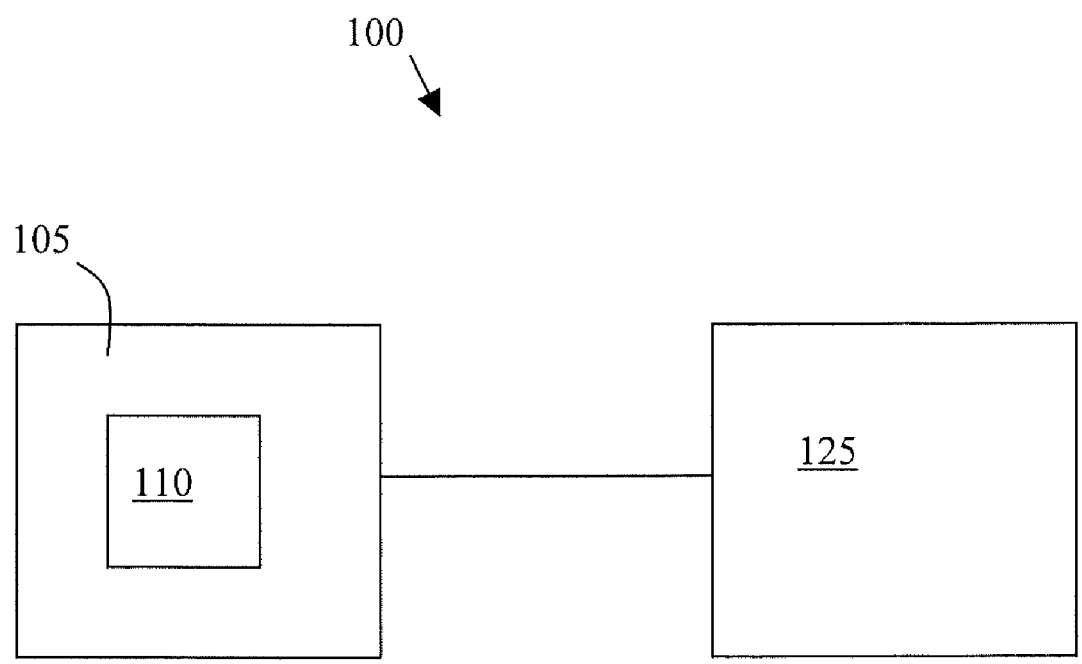
FIG. 1 is an exemplary embodiment of a system for performing methods described herein.

An exemplary embodiment of the present invention provides a method and computer program product for determining a required precision of an intermediate quotient, which may include an intermediate quotient calculated in a fixed-point divide algorithm, and determining therefrom a number of iterations to be performed during the fixed-point divide algorithm to produce the required precision. One object of this invention is to detect various conditions which may allow fewer iterations, thus improving performance. Another object is to detect various special case conditions early to allow elimination of all iterations, thus improving performance.

The method includes inspecting the dividend at the beginning of the operation and determining the number of iterations required based on the magnitude of the dividend. The method may also include controlling the number of iterations performed by the operation based on the magnitude of the dividend. In one embodiment, the number of iterations is determined based on the number of significant bits in the dividend. In another embodiment, the number of iterations is determined from the exponent when the dividend is converted to a floating point number. Thus, the method allows for the number of iterations performed to be only those that are needed for the required quotient precision and only when no special cases as described below are detected. This may limit the number of required iterations to less than the maximum number of iterations otherwise required by the algorithm, and thus less than the maximum precision required by the algorithm, thereby increasing processing speed and performance. The methods described for this embodiment are provided for use with iterative divide algorithms such as Newton-Raphson and Goldschmidt algorithms.

In some embodiments, it is possible to detect certain special case conditions given the values and/or magnitudes of the dividend (i.e., numerator) and/or the divisor (i.e., denominator) and determine that no iterations are required at all. Such cases include when either operand is zero, when the divisor is larger than the dividend and thus results in a quotient of zero, and also when the result is too large for the result word size, thus causing an overflow exception. Another such special case condition is when the divisor is determined to have the value 1, resulting in a quotient equal to the dividend. Detecting special cases to eliminate iterations may also increase processing speed and performance. The methods described for detecting special cases and finishing early may be used with or adapted to any integer divide algorithms, including both iterative and SRT algorithms.

An example of an iterative algorithm for use in conjunction with the method described herein is described below, and is referred to herein as the "Integer Divide" algorithm. The Integer Divide is an iterative algorithm for producing a quotient from a fixed point division operation performed on two integer operands. The integer operands include a dividend and a divisor. The Integer Divide algorithm first converts the integer operands to floating point format, uses a lookup table to obtain an estimate of the reciprocal of the divisor, and multiplies that reciprocal estimate by the dividend to obtain an estimate of the quotient. The algorithm then uses a sequence of floating-point multiply-add and other floating-point instructions to iterate on those estimates to produce a floating point value for the intermediate quotient having a sufficient precision. The final step includes adding a very small constant that ensures an intermediate quotient greater in magnitude than the required final result. At this point, that value is rounded down to the nearest integer whose magnitude is not larger than the infinitely precise quotient.

The algorithms and methods described herein may be implemented in any suitable processor or other hardware. An example of such hardware is IBM (International Business Machines) Corporation's Z-Series Binary Floating Point Unit (FPU). Another example is a PowerPC processor (e.g., generation P6) binary FPU. Both units are pipelined fused multiply-add units that may be modified to also provide other functions, such as instructions that convert numbers between integer and floating point formats.

FIG. 1 depicts a system 100 suitable for implementing the method for determining a required quotient precision. The system 100 includes a microprocessor 105 or other processor, such as a FPU or a central processing unit (CPU) which includes a processor function 110 for performing the method. The system also includes an optional instruction dispatching unit (IDU) 125 for receiving information from the microprocessor 105 and dispatching instructions to the microprocessor 105. The system 100 described herein is merely exemplary. The system may include any additional components as necessary to provide for processing of data. Exemplary components include, without limitation, storage, memory, input devices, output devices and the like. As these components are known to those skilled in the art, these are not depicted in any detail herein.

The following is an example of a fixed-point divide algorithm for integer division of a dividend (described below as "A") and a divisor (described below as "B"), which may be used by any suitable execution unit, such as a FPU or other processor. This example is a divide of 64 bit data units, although an architecture supporting any suitable data unit size may be used.

The fixed point divide algorithm uses a Taylor series approximation of the reciprocal of the divisor B. Each pass or iteration represents a group of independent operations which are only dependent on results from previous passes. The operations within a pass may be executed in any order, or even at the same time using more than one execution unit. Results of one operation may be used in a subsequent operation during the next pass after p cycles, where p is the number of stages in the floating point unit pipeline.

Aspects of the fixed-point divide algorithm are further described in U.S. Patent Publication No. 20060179092 to Martin Schmookler, published Aug. 10, 2006, which is hereby incorporated herein by reference in its entirety. The operations performed in hardware by the fixed-point divide algorithm described herein are based on a software algorithm published by Peter Markstein et al. in "Integer Divide and Remainder Operations in the IA-64 Architecture," Proceedings of the Fourth International Conference on Numbers and Computing, pp. 161-184, April 2000, which is hereby incorporated by reference. In this article, Markstein et al. describe a software algorithm for performing integer divide operations using software floating-point instructions. The fixed-point divide algorithm described herein adapts the algorithm described in Markstein so that it may be executed as a single fixed point instruction using a floating point unit.

As described below, "fx2fp" refers to a function which converts a signed or unsigned integer to floating point format, and "truncate" is a function which rounds its argument down to the next integer value and then converts it to fixed point format. The floating point dividend is described below as "a", and the floating point divisor is described below as "b".

The algorithm includes iteratively calculating reciprocal estimates of the divisor, and iteratively calculating estimates of the quotient. In this example, the initial reciprocal estimate has 14 bit precision. For implementations with a less accurate initial estimate, more iterations are needed.

The exemplary procedure includes the following steps or passes. The following steps or passes are not limited to those described in the example below. The number of passes, including the number of successive estimations of the reciprocal and the quotient, are not limited, and may include any number required to achieve a desired quotient precision.

In a first pass, the following operations are performed to calculate an initial reciprocal estimate:
1. fx2fp(B); convert fixed point integer B to floating point integer b.
2. fx2fp(A); convert fixed point integer A to floating point integer a.

3. y0=~1/b; obtain reciprocal estimate, which has greater than 14 bit precision in this example; with special hardware, the reciprocal may be obtained at the same time that the data is converted to floating point form.

In a second pass, the following operations are performed to calculate an initial quotient and an associated initial error:
1. e=1−b*y0; calculate a first error "e" of the reciprocal estimate, $|e|<2^{-14}$.
2. q0=a*y0; calculate the initial quotient "q0", which in this example has greater than 14 bit precision.

In a third pass, the following operations are performed to calculate a second reciprocal estimate and a second quotient, which each have greater than 28 bit precision:
1. e2=1+e*e; calculate a second error "e2".
2. y1=y0+y0*e; calculate the second reciprocal estimate having greater than 28 bit precision.
3. q1=q0+q0*e; calculate the second quotient having greater than 28 bit precision.

In a fourth pass, the following operations are performed to calculate a third reciprocal estimate and a remainder "r":
1. y2 =y1*e2; calculate the third reciprocal estimate, which has a greater than 56 bit precision.
2. r=a−b*q1; calculate the remainder, which may also be represented by $r=a*e^2$ In a fifth pass, the following operations are performed to calculate an addend "p":
1. p=r*y2

In a sixth pass, the following operations are performed to calculate a third and final quotient "q2", using an addend "p" and a correction constant "del". In this example, where A may have as many as 64 significant bits, del has a value corresponding to the exponent of q1 less 70. Thus, it adds a one to the result 70 places to the right of the most significant bit (MSB) of q1. This value of del is therefore referred to as "d70":
1. q2=p+q1+d70; calculate the final quotient, where d70 is approximately $2^{-70}$ times q1. Before truncation, the intermediate value of q2 has about 80 bits of precision.

In a seventh pass, the following operations are performed to truncate and convert q2 to a fixed point quotient "Q":
1 . Q=truncate(q2)

The use of a correction constant "del" is one possible way of getting the quotient result truncated properly. In the example above, del is d70 for the 64 bit divide. Since the largest value of the divisor B for a 64 bit divide is less than $2^{64}$, d70 must be smaller than $2^{-64}*q$. In one embodiment, the multiplier includes an extra partial product that allows these constants to be added to the final quotient. The value of the constant is relative to the bits of the product in the multiplier. In the operation for q2, d70 must be placed at relative to the MSB of q1. Therefore, p must be the addend, and q1 is put through the multiplier, so that d70 aligns with q1. Thus, q2 is actually calculated as:

$$q2=p+q1*1+d70.$$

Because the error in q2 may be negative, a positive error is ensured by adding the value del which has the following constraint:

$$|del|>|Ee|+|Er|$$

"Ee" refers to the relative error in the final quotient due to the "e" value, and "Er" refers to the relative error in the final quotient due to the rounding of the remainder and the last reciprocal estimate. In the example described above for a 64 bit divide, $Ee=-q2*e^6$, and $Er=q2*(e^2)*(2^{-51})$. With $|e|<2^{-14}$, $|Ee|<|q2|*2^{-84}$ and $|Er|<|q2|*2^{-79}$. Thus, d70 has a lower constraint of $|d70|>|q2|*2^{-79}$.

Using the absolute values of the dividend a and the divisor b, it must also be ensured that q2<(a+1)/b and therefore does not round to the next higher integer quotient. This can be ensured with the following constraint:

$$|del|<1/b-|Er|.$$

Since q/a=1/b, it can alternatively be expressed as $$|del|<|q2|*(1/a)-|q2|*2^{-79}.$$

For d70, The largest allowable value of a for a full unsigned 64-bit integer divide is close to $2^{64}$, thus d70 has an upper constraint of $|d70|<|q2|*2^{-64}$.

If d70 is added into q2 using the extra partial product described above, then it is convenient to use the constraint which shows where it may be placed relative to the quotient. This shows that a value close to $q*2^{-70}$ falls well within both constraints. The actual value chosen and the lower constraint also determine how many bits of precision are needed in the intermediate quotient q2.

An alternative way of adding the value of del is directly as an addend to the quotient. In that case, its value may be determined from the constraint relative to b, as shown in the first equation.

The above algorithm may be suitable for large values of A, but inefficient for smaller values. As such, for $|A|<2^{12}$, the dividend can have no more than 12 bits, and as shown above, q0 has sufficient precision. Similarly, for $|A|<2^{25}$, the dividend can have no more than 25 bits, and as shown above, q1 has sufficient precision. Finally, for $|A|<2^{54}$, the dividend can have no more than 54 bits, and therefore passes 4,5,6 in the example above can be replaced with just one pass of q2=q1*e2.

For the case of terminating after q1, it is easier to add the constant del if q1 is calculated as a product rather than with a multiply-add operation. For that reason, passes 2 and 3 are modified as follows:

In pass 2, besides calculating e=1−b*y0, e1 is also calculated by the equation e1=2−b*y0. Thus, e1=e+1. Then in pass 3, q1=q0*e1.

Figure 2:
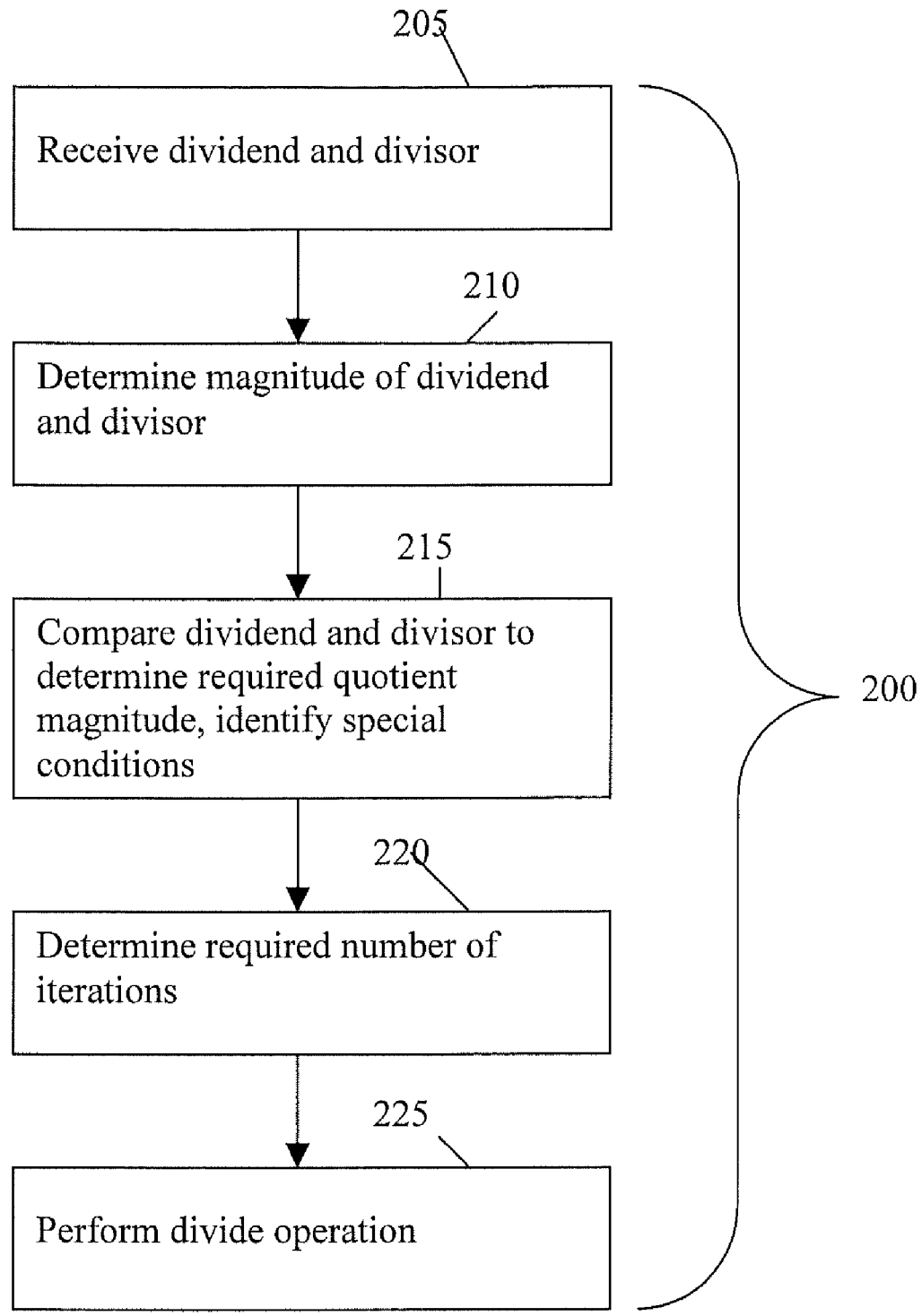
FIG. 2 is a flow chart providing an exemplary method for determining a number of iterations to be performed in a divide algorithm.

Referring to FIG. 2, there is provided a method 200 for determining a required precision of a fixed point divide operation, and a corresponding required number of iterations in a fixed point divide algorithm. The method 200 includes one or more stages 205, 210, 215, 220 and 225. The method 200 is described herein in conjunction with the microprocessor 105, such as a FPU, although the method 200 may be performed in conjunction with any type, number and configuration of processors.

In the first stage 205, the processor, FPU or other hardware, receives data for two operands, i.e., a dividend and a divisor. The processor, in one embodiment, may also receive instructions to perform a fixed point divide operation, such as from the IDU 125.

In the second stage 210, the magnitudes of the dividend and the divisor are determined. In one embodiment, the magnitudes refer to the number of significant digits or bits in each number. In another embodiment, for algorithms that require conversion to floating point format, the magnitude for each of the dividend and the divisor refers to the value represented in the exponent field of the respective dividend or divisor.

In the third stage 215, the dividend magnitude is compared to the divisor magnitude to determine the required magnitude of the quotient. In one embodiment, the required magnitude of the quotient is related to the difference between the magnitudes of the dividend and the divisor. That is, the magnitude of the quotient is either equal to the difference or (difference+1) between the magnitudes of the dividend and the divisor.

Also in this stage, the magnitudes may be inspected to determine if any special cases apply, whereby no iterations of the algorithm are needed, as described below.

In one embodiment, the divisor magnitude is inspected to determine whether the divisor magnitude has a value of "one". In such an instance, the quotient would be equal to the dividend, and thus no iterations would be necessary. This inspection can be performed by counting the number of leading zeros for positive divisors or leading ones for negative divisors. If the divisor is positive and equal to "1", then the divisor must have an amount of leading zeros equal to the maximum number of bits allowed in the divisor minus 1. If the divisor is negative and equal to −1, then the divisor must have an amount of leading ones equal to the maximum number of bits allowed in the divisor (in other words, the divisor must be all ones). For the case where the divisor is −1, the quotient is equal to the negative of the dividend.

In another embodiment, the divisor and the dividend are compared to determine whether the divisor is larger than the dividend. If the divisor has more significant bits (or has a larger exponent if inspecting the floating-point values) than the dividend, then a quotient equal to zero is delivered and no iterations are needed.

If the divisor appears to have the same magnitude (i.e., the same number of significant bits or the same exponent) as the dividend, it may be actually larger, but may not yet be obvious without further inspection. This inspection may include a simple comparison of the operands. Alternatively, a zero quotient may be detected by inspecting the intermediate quotient values $q0$, $q1$. If the magnitude of $q0$ or $q1$ is smaller than one by more than the allowed error for $q0$ or $q1$, then the final quotient will also be below a value of one, a quotient of zero may be delivered, and no further iterations are necessary.

In yet another embodiment, the divisor and the dividend magnitudes are compared to determine whether the dividend is sufficiently larger than the divisor such that the integer quotient is greater than the maximum allowable quotient ("overflow"). If an overflow is detected, an exception occurs and no iterations are necessary.

In the fourth stage 220, if no special cases as described above apply, then the number of iterations to be run by the algorithm is determined by the processor based on the required precision.

In one embodiment, the maximum allowable dividend is determined for the algorithm. The processor may first compare the dividend to the maximum allowable dividend to determine whether fewer iterations are necessary than the number of iterations called for in the algorithm (which is relative to the algorithm's required precision). If the magnitude of the dividend is smaller than the maximum allowable dividend, fewer iterations may be sufficient to generate this quotient. The processor may then proceed to determine whether fewer iterations are sufficient.

For example, referring to the example described above for the 64 bit fixed-point divide algorithm, if the dividend has a magnitude of no more than 12 bits ($A<2^{12}$), then the required precision is reached after the second pass in which the initial quotient $q0$ is calculated. In another example, if the dividend has a magnitude of no more than 25 bits ($A<2^{25}$), then the required precision is reached after the third pass in which the second quotient $q1$ is calculated. In yet another example, if the dividend has a magnitude of no more than 49 bits ($A<2^{**}49$), then passes 4,5,6 may be replaced with just one pass including the following operation:

$$q2=q1*e2.$$

In one embodiment, as discussed above, a correction constant, del, is needed for correct truncation to the correct integer result. A different value of del may be needed for each of the examples.

In one embodiment, if the divisor has a value equal to one (i.e., a "divide-by-one" condition), the quotient is exactly equal to the dividend (with a possible change of sign) and no iterations are performed.

In another embodiment, if it is detected that the magnitude of the divisor is greater than the magnitude of the dividend, then no iterations are performed and a quotient of zero is delivered. In another embodiment, if an overflow condition is detected, an exception occurs and no iterations are performed.

In the fifth stage 225, the divide operation is performed, using only the required number of iterations to achieve the quotient having the required precision.

Technical effects and benefits include reducing the number of iterations that need be performed in a divide algorithm, and thereby increasing processing performance and efficiency. Other benefits include detection of conditions prior to performance of the operation that would restrict or eliminate the number of iterations required in a fixed-point divide operation.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:
1. A method of controlling a fixed point division operation, the method comprising:
   executing, by a processor, an instruction to perform a division operation for a dividend and a divisor, the execution comprising;

calculating a magnitude of the dividend and the divisor, the magnitude selected from one of a number of significant bits and a value represented in an exponent field;

comparing the magnitude of the dividend to the magnitude of the divisor;

prior to performing the division operation, determining a quotient precision based on the comparison, the determining including at least one of:

determining whether a special condition exists for which a required number of iterations is zero, and calculating a difference between the magnitude of the dividend and the magnitude of the divisor;

computing a required number of iterations needed to produce the quotient precision; and performing the required number of iterations.

2. The method of claim 1, wherein each iteration results in an estimated value of the quotient, and each successive iteration results in a successive estimated value having a greater precision than a previous estimated value.

3. The method of claim 1, wherein the dividend magnitude is a first number of significant bits in the dividend, and the divisor magnitude is a second number of significant bits in the divisor.

4. The method of claim 1, wherein the quotient precision is a number of significant bits in the quotient.

5. The method of claim 1, further comprising converting the dividend and the divisor into a floating point format.

6. The method of claim 5, wherein the dividend magnitude is a first value represented in an exponent field of the dividend, and the divisor magnitude is a second value represented in an exponent field of the divisor.

7. The method of claim 1, wherein comparing the magnitude of the dividend to the magnitude of the divisor comprises determining a difference between the magnitudes of the dividend and the divisor.

8. The method of claim 1, wherein:

the special condition is at least one of: the divisor having a value of zero, the dividend having a value of zero, the divisor being greater than the dividend, and the quotient precision being greater than a maximum quotient precision allowed by the operation.

9. The method of claim 1, wherein the special condition includes the divisor having a value of one and the quotient is equal to the dividend.

10. A computer program product for controlling a fixed point division operation, the computer program product comprising:

a computer-readable storage medium for storing instructions for executing a method of:

executing, by a processor, an instruction to perform a division operation for a dividend and a divisor, the execution comprising;

calculating a magnitude of the dividend and the divisor, the magnitude selected from one of a number of significant bits and a value represented in an exponent field;

comparing the magnitude of the dividend to the magnitude of the divisor;

prior to performing the division operation, determining a quotient precision based on the comparison, the determining including at least one of:

determining whether a special condition exists for which a required number of iterations is zero, and calculating a difference between the magnitude of the dividend and the magnitude of the divisor;

computing a required number of iterations needed to produce the quotient precision; and performing the required number of iterations.

11. The computer program product of claim 10, wherein each iteration results in an estimated value of the quotient, and each successive iteration results in a successive estimated value having a greater precision than a previous estimated value.

12. The computer program product of claim 10, wherein the dividend magnitude is a first number of significant bits in the dividend, and the divisor magnitude is a second number of significant bits in the divisor.

13. The computer program product of claim 10, wherein the quotient precision is a number of significant bits in the quotient.

14. The computer program product of claim 10, further comprising converting the dividend and the divisor into a floating point format.

15. The computer program product of claim 14, wherein the dividend magnitude is a first value represented in an exponent field of the dividend, and the divisor magnitude is a second value represented in an exponent field of the divisor.

16. The computer program product of claim 10, wherein the special condition includes at least one of: the divisor having a value of zero, the dividend having a value of zero, the divisor being greater than the dividend, and the quotient precision being greater than a maximum quotient precision allowed by the operation, wherein the required number of iterations is zero.

17. The computer program product of claim 10, wherein the special condition includes the divisor having a value of one and the quotient is equal to the dividend.

18. A system for controlling a fixed point division operation, the system comprising:

an instruction dispatching unit (IDU) for sending an instruction to perform a division operation for a dividend and a divisor; and a processor in operable communication with the IDU, the processor performing:

executing the instruction from the IDU, the execution comprising;

calculating a magnitude of the dividend and the divisor, the magnitude selected from one of a number of significant bits and a value represented in an exponent field;

comparing the magnitude of the dividend to the magnitude of the divisor;

prior to performing the division operation, determining a quotient precision based on the comparison, the determining including at least one of:

determining whether a special condition exists for which a required number of iterations is zero, and calculating a difference between the magnitude of the dividend and the magnitude of the divisor;

computing a required number of iterations needed to produce the quotient precision; and performing the required number of iterations.

* * * * *